United States Patent [19]

Bolenbaugh et al.

[11] Patent Number: 5,772,021
[45] Date of Patent: Jun. 30, 1998

[54] APPARATUS AND METHOD FOR PACKAGING AND STORING A COMPACT DISC

[75] Inventors: Randall E. Bolenbaugh; Larry W. Johnson, both of Fort Wayne, Ind.

[73] Assignee: International Packaging Corporation, Fort Wayne, Ind.

[21] Appl. No.: 680,512

[22] Filed: Jul. 9, 1996

[51] Int. Cl.[6] .................................................. B65D 85/57
[52] U.S. Cl. ...................................... 206/310; 206/308.1
[58] Field of Search ....................... 206/308.1, 307–313, 206/493, 232

[56] References Cited

U.S. PATENT DOCUMENTS

| | | | |
|---|---|---|---|
| 2,435,856 | 2/1948 | Weingart | 206/310 |
| 5,377,825 | 1/1995 | Sykes et al. | 206/310 |
| 5,381,894 | 1/1995 | Misterka et al. | 206/310 |
| 5,417,324 | 5/1995 | Joyce et al. | 206/310 |
| 5,477,961 | 12/1995 | Taniyama | 206/310 |
| 5,515,968 | 5/1996 | Taniyama | 206/310 |
| 5,558,220 | 9/1996 | Gartz | 206/310 |
| 5,586,651 | 12/1996 | Krummenacher | 206/310 |

*Primary Examiner*—Paul T. Sewell
*Assistant Examiner*—Luan K. Bui
*Attorney, Agent, or Firm*—Baker & Daniels

[57] ABSTRACT

Apparatus and method for packaging and storing a compact disc. A central hub, comprised of a number of deformable segments, is provided to penetrate the central aperture of a compact disc. Around the outside perimeter of the central hub, which has a circular shape, is at least one detachable or inwardly deformable retaining hook. A compact disc is initially secured to the central hub by pressing the compact disc against the central hub and thereby moving the deformable segments inward. The compact disc mounts onto, and is retained by, the central hub after the compact disc has passed the retaining hooks. Passing the retaining hooks allows the deformable segments to snap back into their original position and allows the retaining hooks to hold the compact disc to the central hub. The compact disc is removed by pulling the compact disc away from the central hub with enough force to break the retaining hooks away from the deformable segments or inwardly deform the retaining hooks. The compact disc can then be returned by again securing the disc to the central hub and allowing the angled shape of the deformable segments to frictionally hold the disc in place until sufficient force is again applied to remove the disc.

14 Claims, 2 Drawing Sheets

APPARATUS AND METHOD FOR PACKAGING AND STORING A COMPACT DISC

BACKGROUND OF THE INVENTION

1. Field of the Invention

The present invention generally relates to devices and methods for packaging and storing compact discs.

2. Description of the Related Art

Compact discs are typically packaged in containers which are designed to protect the optically readable surfaces of the disc. However, during the turbulent motions associated with transporting a compact disc from the manufacturing plant, to the distributor, to the retailer, and ultimately to the consumer, the disc and its container will usually be tossed about a considerable amount. It is therefore possible for the disc to disengage from the hub holding the disc in a secure position and be damaged as a result. Moreover, if the disc does become disengaged and is loose within the container, the disc is likely to fall from the container when opened, and the disc can be damaged or rendered unusable.

Disengagement of the disc from the container becomes an increasingly troublesome problem when the size of the container expands. If the container has relatively little excess room, or headspace, such as typical audio compact disc containers, the disc has little room to move and is therefore less likely to become disengaged from the retaining hub. However, if the container has a relatively large headspace, such as typical video compact disc containers, the disc has more room to move about and is therefore more susceptible to becoming disengaged.

Prior attempts to address this problem have proven to be unsatisfactory. One method requires the manufacturer to insert a foam, or similarly soft and resilient material, lining between the compact disc and the container to fill the headspace. The foam, at least in theory, will maintain the disc in position without scratching or damaging the disc. However, the foam creates an added cost for the manufacturer which in turn must be passed on to the consumer. The foam also creates an unsightly and cumbersome element within an otherwise well conceived product.

Another method requires production of an oversized or stiff, angled central hub which will very tightly grip the compact disc. An oversized or angled central hub will maintain the compact disc in a secure position by frictionally gripping the disc. A problem with oversized or angled central hubs is that the central hub must be somewhat deformable to allow removal of the disc. During the transportation of the container to the consumer, the central hub is often deformed to the point where the disc is free to disengage from the hub and therefore become damaged.

SUMMARY OF THE INVENTION

The present invention is directed to an apparatus for packaging and storing a compact disc which satisfies the above-identified needs. The present invention protects the disc during transportation by providing retaining hooks to safely maintain the disc in position. Moreover, these retaining hooks are made detachable or deformable to allow for easy removal of the disc and subsequent replacement when the user so desires. The disc is therefore safely held in position during initial packaging and after removal and replacement.

The present invention, in one embodiment, is a central hub to which a compact disc is secured. In other embodiments, the present invention may additionally consist of a central hub disposed on a tray, or a central hub disposed on a tray which, in turn, is contained with a housing. The central hub comprises of a plurality of deformable segments which are arranged in a circular pattern matching that of the typical internal aperture diameter of a compact disc. Since the segments are deformable, they can be moved inward to decrease the diameter of the central hub during attachment of the compact disc and then outward to exert sufficient force to frictionally hold the compact disc.

In addition to the natural outward bias of the deformable segments the compact disc is held in place by two additional elements. First, the shape of the deformable segments is such that the bottom of the segment is narrower than the top. Thus, the compact disc remains attached to the hub because the top of the hub has a greater diameter than the aperture of the compact disc. Second, detachable retaining hooks are attached to the outside perimeter of the central hub. These retaining hooks overlap the compact disc to hold the disc in place until enough force is applied to the disc during removal to break the hooks away from the central hub, or deform the hooks inwardly. The retaining hooks provide the additional holding strength needed during transportation, but also allow for the disc to be removed by the consumer.

One advantage of the present invention is that it provides a mechanism which can securely hold a compact disc during the physically demanding process of transporting the disc.

Another advantage of the present invention is that it allows for relatively easy removal of the disc from the central hub even though the disc is securely held for transportation purposes.

Another advantage of the present invention is that it allows for relatively easy return and subsequent removal of the disc to the central hub after the initial removal.

Still another advantage of the present invention is that it is made of fewer parts than is required by the prior art and thereby results in a less expensive product.

The present invention, in one form thereof, is a compact disc retainer for a compact disc having a central aperture, which includes a plurality of elastically deformable segments and at least one retaining hook. The formable segments are arranged in a circular pattern defining a central hub. The central hub has a diameter slightly larger than the diameter of the compact disc central aperture, and is secured to a base. The retaining hook is integral with the deformable segments, and is adapted to initially overhang the compact disc and then plastically deform to an extent which allows removal of the compact disc.

The present invention, in another form thereof, is a method of packaging, removing, and storing a compact disc. A central hub is provided and is comprised of a plurality of deformable segments at least one of which has a retaining hook integral therewith. A compact disc is then pressed onto the central hub so that the central aperture of the compact disc circumscribes the central hub and at least one retaining hook overhangs the compact disc. The compact disc is removed from the central hub by breaking the retaining hook away from the deformable segments or by inwardly deforming the retaining hook so that the compact disc is able to pass. Finally, the compact disc is replaced onto the central hub and frictionally held in place by the deformable segments.

The present invention, in yet another form thereof, is a compact disc retainer comprising a tray, a central hub, and at least one retaining hook. The central hub is attached to the tray, has a plurality of elastically deformable segments, and is adapted to receive the central aperture of a compact disc. The retaining hook is integral with one of the formable segments, and is adapted to initially overhang the compact disc and then plastically deform to an extent which allows removable of the compact disc.

The present invention, in still another form thereof, is a compact disc container comprising a housing and a tray. The housing includes both a base and a lid which is attached to the base with a hinge. The tray fits within the base and is thereby enclosed within the housing when the lid is shut. A central hub having a plurality of deformable segments is formed on the tray with at least one retaining hook integral with the deformable segments for retention of the compact disc to the tray.

BRIEF DESCRIPTION OF THE DRAWINGS

These and other features, aspects, and advantages of the present invention will become better understood with regard to the following description, claims, and accompanying drawings where:

Corresponding reference characters indicate corresponding parts throughout the several views. The exemplification set out herein illustrates one embodiment of the invention, and such exemplification is not to be construed as limiting the scope of the invention in any manner.

DETAILED DESCRIPTION OF THE INVENTION

Figure 1:
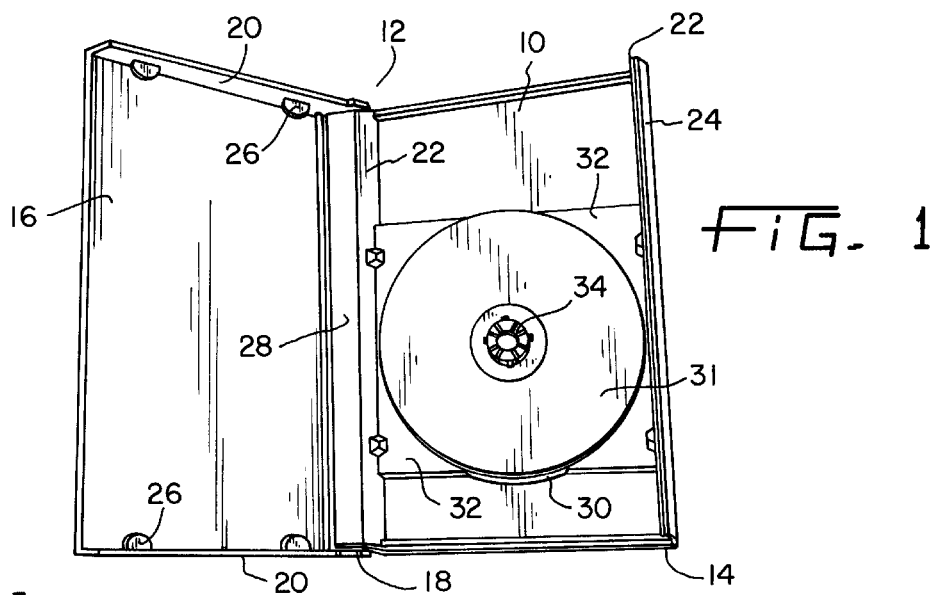
FIG. 1 is a perspective view of an apparatus according to the present invention shown in an open position.

Now, referring to FIG. 1, an explanation of the present invention will be described.

In the exemplary embodiment, the present invention is comprised of central hub 34 disposed on compact disc tray 10 which is enclosed within a housing, generally depicted as element 12. In other embodiments, the present invention may consist of only central hub 34 or central hub 34 and tray 10. Housing 12 includes both a base 14 and a lid 16. Lid 16 is rotatably attached to the base 14 via hinge 18. In the exemplary embodiment, housing 12 is made of an entirely clear plastic, but this does not serve as a limitation of the present invention.

Lid 16 is a generally planar surface with two attached endwalls 20. Base 14 is also a generally planar surface but has, in lieu of endwalls, two attached side walls 24. The planar surfaces of lid 16 and base 14 cooperate with lid end walls 20 and base side walls 24 to define a parallelepiped. Attached to each of end walls 20 are a plurality of jacket tabs 26. Jacket tabs 26 protrude toward the interior of housing 12 and allow for insertion of a promotional jacket or similar literature for marketing purposes.

Tray 10 is also of a generally planar shape and includes an attached side wall 22 on one side and an attached side wall 22 with an exterior flange 28 on the opposing side. Both tray side walls 22 lie adjacent to base side walls 24, with exterior flange 28 lying adjacent to hinge 18. Within tray 10 is a recessed circular cavity 30 corresponding to the approximate diameter of compact disc 31. Adjacent to tray side walls 28 are two raised collars 32 which partially circumscribe circular cavity 30. Recessed circular cavity 30 and raised collars 32 cooperate to define the area for compact disc storage. Tray 10 and central hub 34 are injected molded and may be formed of any suitable plastic.

Figure 3:
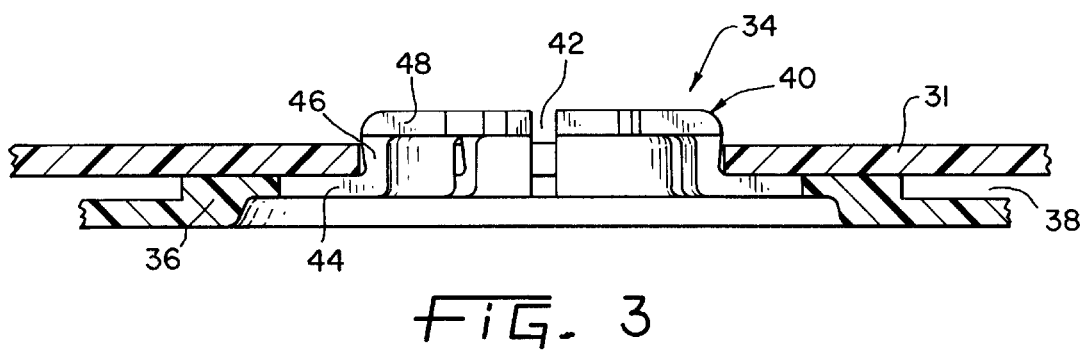
FIG. 3 is a sectional view taken along line 3—3 of FIG. 2 and showing the central hub and compact disc after the disc has been removed from the hub for the first time and returned for storage.

As best depicted in FIGS. 1 and 3, central hub 34 is integral with tray 10 at the center of recessed circular cavity 30 via raised platform 36. Raised platform 36 prevents the readable surface of compact disc 31 from coming into damaging contact with tray 10. It also creates a leverage channel 38 between compact disc 31 and tray 10 which enables a user to pry compact disc 31 off central hub 34.

Central hub 34 is comprised of a plurality of elastically deformable segments 40. These deformable segments 40 are separated by slots 42 which allow deformable segments 40 to move. Each deformable segment 40 includes a base portion 44, a stem 46, and a top portion 48. Base portion 44 is integral with raised platform 36 and stem 46 extends upwardly from base portion 44. Top portion 48 is integral with stem 46 and is parallel to base portion 44. The thickness of stem 46 gradually increases from the point where stem 46 is attached to base portion 44 to the point where stem 46 is attached to top portion 48. This results in inside angle 50 between stem 46 and bottom support 44 being acute. The cumulative effect of the acutely angled stems 46 on central hub 34 is that the outside perimeter of central hub 34 maintains a frusto-conical shape. The frusto-conical shape provides the necessary friction to hold disc 31 securely on hub 34.

Figure 2:
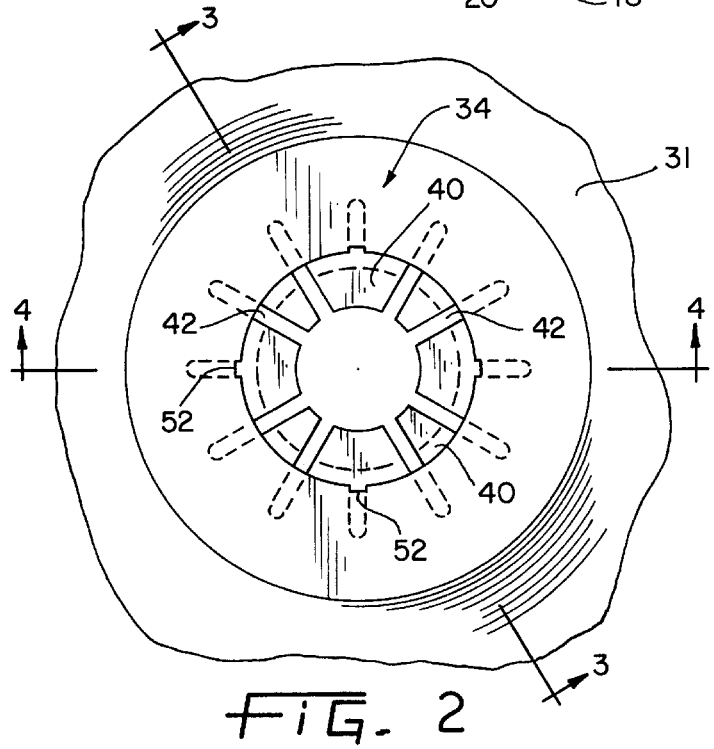
FIG. 2 is an enlarged fragmentary plan view of the tray central hub showing a disc in place.
Figure 5:
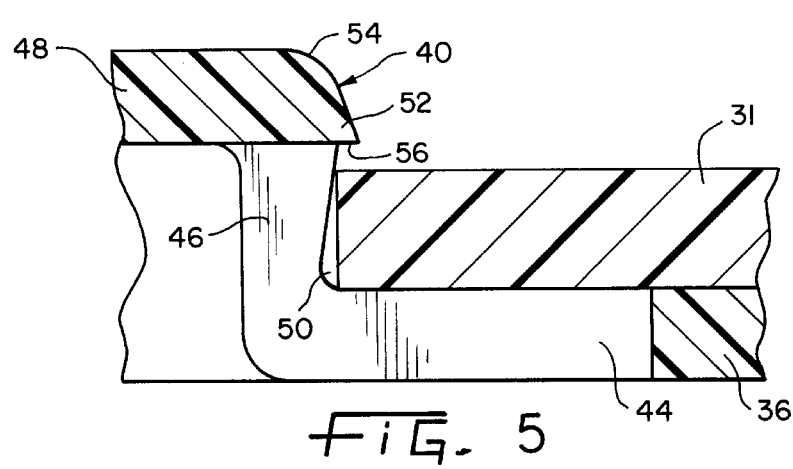
FIG. 5 is an enlarged fragmentary sectional view of the nexus between the compact disc and the central hub with the retaining hook intact.
Figure 6:
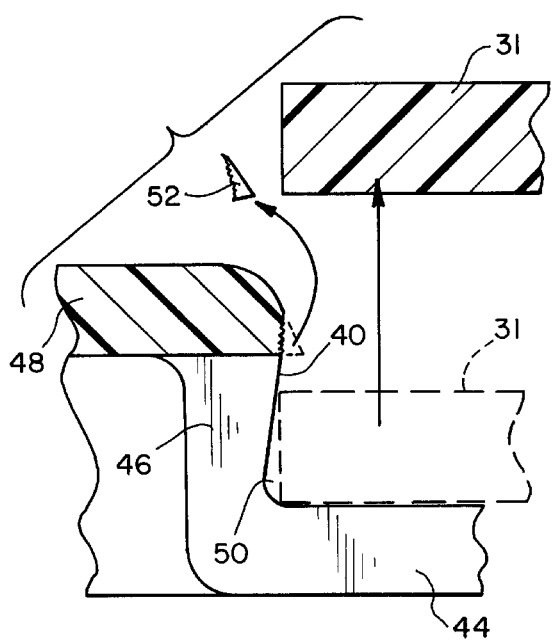
FIG. 6 is an enlarged fragmentary view of the nexus between the compact disc and the central hub after the compact disc is removed and thereby breaks away the retaining hook.

As best depicted by the embodiment shown in FIG. 2, central hub 34 comprises eight deformable segments 40 arranged in a circular pattern and divided by eight slots 42. Retaining hooks 52 are integral with four of deformable segments 40 around the outside perimeter of central hub 34. FIG. 5 shows retaining hook 52 while it is still attached to deformable segment 40, while FIG. 6 shows a retaining hook 52 after it has been sheared from deformable segment 40. Although not shown in any figure, the present invention also allows for a different number of deformable segments 40 and a different number of retaining hooks 52. Retaining hooks 52 also need not be sheared from deformable segments 40, but rather can be inwardly deformed to allow compact disc 31 to be removed. Retaining hook 52 has two main surfaces, arcuate top surface 54 and bottom ledge 56. Arcuate top surface 54 is curved to more easily allow the force of an approaching compact disc to move the deformable segment 40 inward during the initial insertion of the compact disc onto tray 10. Bottom ledge 56, which is parallel to tray 10 and overhangs disc 31, serves the purpose of holding compact disc 31 in place during the storage and shipping of the unit before the initial removal of compact disc 31.

Figure 4:
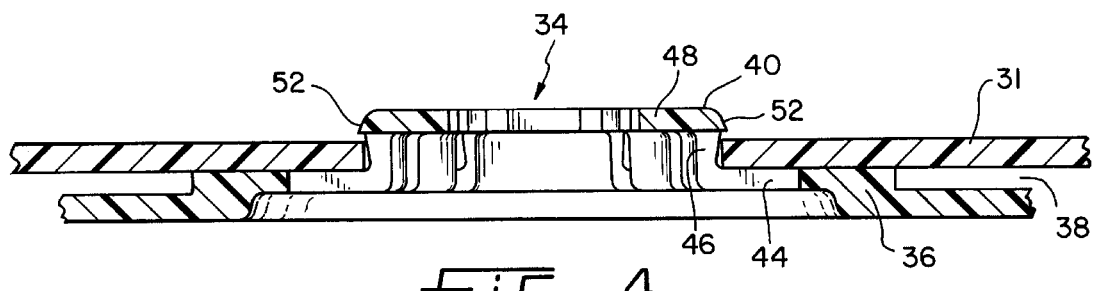
FIG. 4 is a sectional view taken along line 4—4 of FIG. 4 showing the central hub and compact disc before initial removal of the disc and thus with the retaining hooks still intact.

Turning now to the method of operation involved with the present invention, FIGS. 4 and 5 show central hub 34 after compact disc 31 has been secured in place for the first time. This is accomplished by pressing compact disc 31 onto central hub 34 with enough force to move deformable segments 40 inward. After compact disc 31 has passed arcuate top surface 54 of retaining hook 52, each deformable segment 40 snaps back into its original position given its elastic properties. In this position, removal of compact disc 31 is impeded by bottom ledges 56 of retaining hooks 52 and by the frusto-conical shape of central hub 34.

When a user wishes to remove compact disc 31 from central hub 34 for the first time, retaining hooks 52 are removed as shown in FIG. 6 or inwardly deformed. Since retaining hooks 52 are detachable, if enough force is applied to the underside of compact disc 31, compact disc 31 will push against bottom ledge 56 until retaining hooks 52 break away from deformable segments 40 or, at least, inwardly deform. Force applied to the underside of compact disc 31 will also move deformable segments 40 inward so as to allow compact disc 31 to move past central hub 34.

Figure 7:
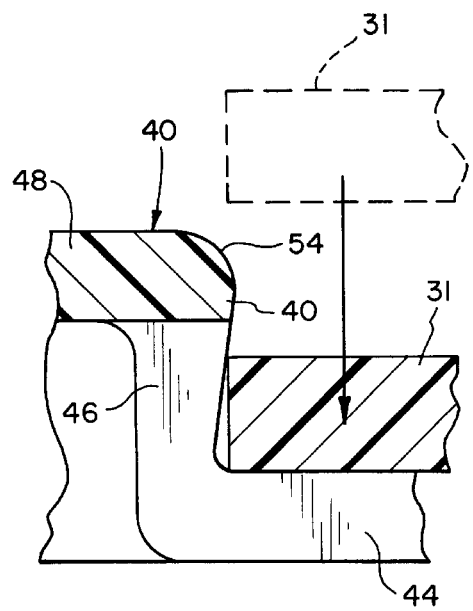
FIG. 7 is an enlarged fragmentary view of the nexus between the compact disc and the central hub after the compact disc is returned to the hub for storage.

When the user is finished using compact disc 31, disc 31 can be returned to central hub 34 for storage as shown in FIG. 3 and FIG. 7. If compact disc 31 is depressed onto central hub 34 with sufficient force, deformable segments 40 will move inward to allow compact disc 31 to be secured to central hub 34. Compact disc 31 will no longer be retained in tray 10 by retaining hooks 52 but will be frictionally retained by the angled shape of stem 46 which produces the aforementioned frusto-conical shape as shown in FIGS. 3 and 7. At this stage, compact disc 31 can be more easily removed due to the removal or inward deformation of retaining hooks 52, but is still secured to central hub 34 until sufficient force is applied to the underside of compact disc 31 to force deformable segments 40 inward and thereby allow compact disc 31 to pass.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A compact disc retainer for a compact disc having a central aperture, said compact disc retainer comprising:
    a plurality of elastically deformable segments arranged in a circular pattern defining a central hub, said central hub having a diameter slightly larger than the diameter of the compact disc central aperture, said deformable segments being secured to a base; and
    at least one retaining hook integral with said deformable segments, said retaining hook adapted to initially overhang the compact disc including a contact surface adapted to contact the compact disc and resist removal of the compact disc, said retaining hook adapted to detach from one of said deformable segments when pressure is applied to said contact surface by the compact disc to thereby allow removal of the compact disc.

2. The compact disc retainer of claim 1, wherein said central hub has a frusto-conical shape, said frusto-conically shaped central hub frictionally engaging said compact disc and securing said compact disc to said central hub.

3. The compact disc retainer of claim 1, further including a plurality of said retaining hooks integral with said plurality of said deformable segments.

4. The compact disc retainer of claim 3, wherein said retaining hooks have a sloped top surface and a planar bottom ledge, said bottom ledge generally parallel to the compact disc, said top surface angled from said deformable segments to said bottom ledge.

5. The compact disc retainer of claim 3, wherein said deformable segments each comprises a base portion, a stem extending upwardly from said base portion, and a top portion parallel to the compact disc.

6. The compact disc retainer of claim 5, wherein said top portion is curvilinear to assist pressing of the compact disc on said central hub.

7. The compact disc retainer of claim 1, wherein said central hub further comprises a central aperture to allow for inward deformation of said deformable segments.

8. A compact disc retainer comprising:
    a tray;
    a central hub attached to said tray having a plurality of elastically deformable segments, said central hub adapted to receive the central aperture of a compact disc; and
    at least one retaining hook integral with said deformable segments, said retaining hook adapted to initially overhang the compact disc and including a contact surface adapted to contact the compact disc and resist removal of the compact disc, said retaining hook adapted to detach from one of said deformable segments when pressure is applied to said contact surface by the compact disc to thereby allow removal of the compact disc.

9. The compact disc retainer of claim 8, wherein said central hub has a frusto-conical shape whereby the compact disc is frictionally secured to said central hub.

10. The compact disc retainer of claim 8, further including a plurality of said retaining hooks integral with said plurality of said deformable segments.

11. The compact disc retainer of claim 8, wherein said central hub further comprises a central aperture to allow for inward deformation of said deformable segments.

12. A compact disc container, comprising;
    a housing having a base and a lid attached to said base;
    a tray attached to said base;
    a central hub attached to said tray and including a plurality of elastically deformable segments, said central hub adapted to receive the central aperture of a compact disc; and
    at least one retaining hook integral with one of said deformable segments, said retaining hook adapted to initially overhang the compact disc and including a contact surface adapted to contact the compact disc and resist removal of the compact disc, said retaining hook adapted to detach from one of said deformable segments when pressure is applied to said contact surface by the compact disc to thereby allow removal of the compact disc.

13. The compact disc container of claim 12, wherein said elastically deformable segments frictionally engage the compact disc.

14. The compact disc retainer of claim 12, further including a plurality of said retaining hooks integral with said plurality of said deformable segments.

* * * * *